No. 740,035. PATENTED SEPT. 29, 1903.
C. C. & C. S. NICHOLS.
TRACTION WHEEL.
APPLICATION FILED MAY 7, 1903.
NO MODEL.

No. 740,035. Patented September 29, 1903.

UNITED STATES PATENT OFFICE.

CLAUD C. NICHOLS AND CHARLES S. NICHOLS, OF ROSELAND, NEBRASKA.

TRACTION-WHEEL.

SPECIFICATION forming part of Letters Patent No. 740,035, dated September 29, 1903.

Application filed May 7, 1903. Serial No. 156,090. (No model.)

*To all whom it may concern:*

Be it known that we, CLAUD C. NICHOLS and CHARLES S. NICHOLS, citizens of the United States, residing at Roseland, in the county of Adams and State of Nebraska, have invented certain new and useful Improvements in Traction-Wheels; and we do hereby declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to traction-wheels for traction-engines and similar heavy self-propelling vehicles.

The object of the invention is to produce a wheel adapted to all kinds and conditions of soil and which will not become clogged with mud.

The ordinary traction-wheels have flat faces with lugs thereon intended to sink into the ground to prevent slipping; but this form is unsatisfactory, because it tends to pack between the lugs, thus defeating its object and necessitating frequent cleaning out of the dirt and mud between the lugs. Furthermore, on dry hard ground very little surface bearing is desirable or needed for the wheels, and a bearing is desired which will not cut planks in crossing bridges and culverts. On muddy roads a wide flat wheel is more objectionable than a narrow wheel, because the former will simply fill up and slip, whereas the latter will sink down in the mud into the solid ground; but in loose or sandy soil a narrow wheel will sink too deep under the load.

The object of our wheel is to remedy these defects by the production of a rim which will give a narrow continuous bearing when desired, as on hard ground or plank, and which in muddy ground will give a broad bearing which will not only clean itself, but also adjust itself to suit the different conditions of the soil. The shape of our wheel is such that it also tends to prevent side slip of the wheel in muddy ground, which is a common and objectionable occurrence in traction-engines.

Figure 1:
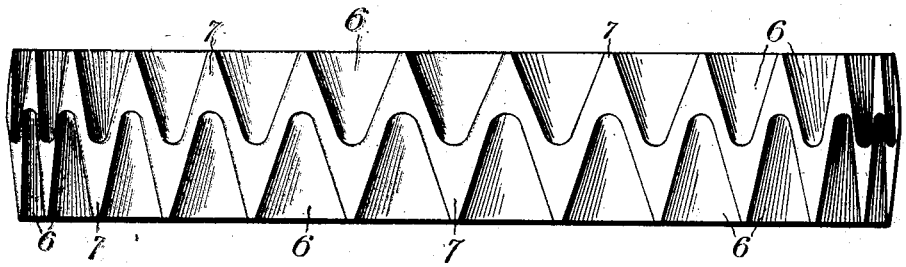
Figure 2:
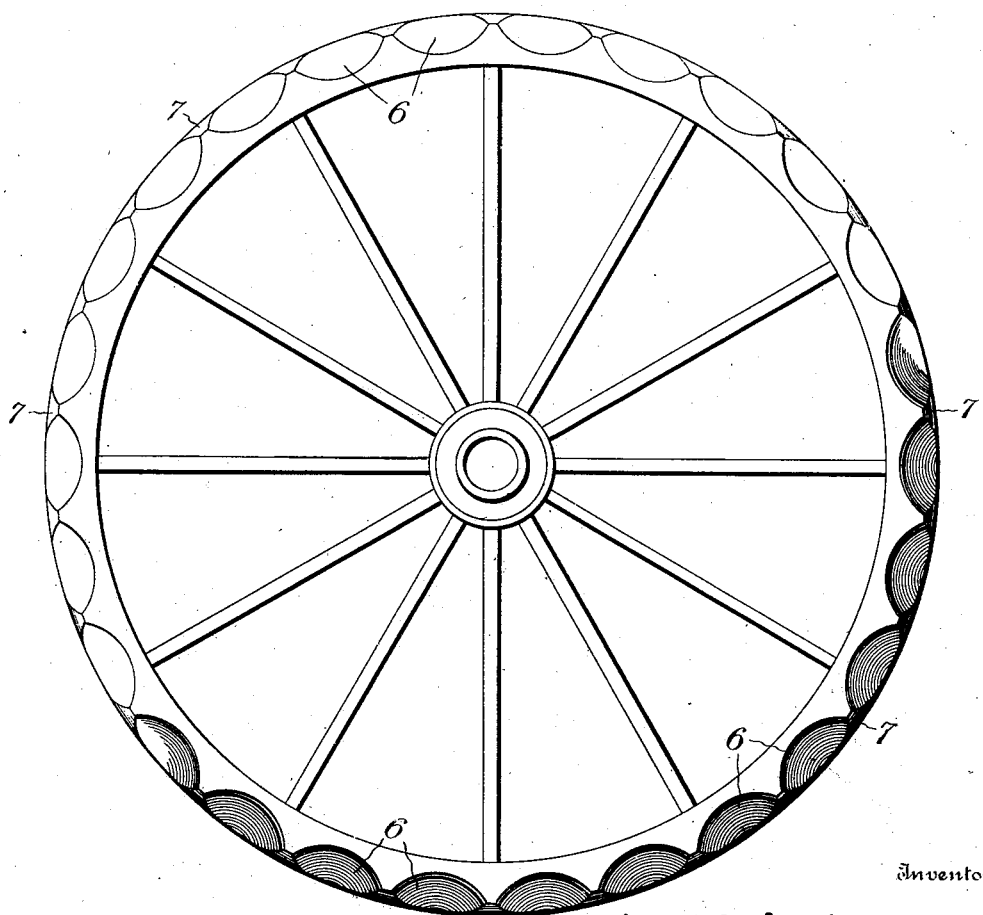

In the accompanying drawings, Figure 1 is an edge view of the wheel. Fig. 2 is a side view thereof.

By referring to the drawings it will be seen that the bearing-face of the rim is convex in cross-section and has cut therein a series of conical or tapering recesses 6, which are located alternately on opposite sides. The recesses increase in width and depth toward the outer edge of the wheel and merge into the surface at or about the middle line. The alternation of the recesses leaves a zigzag surface 7, extending around the wheel, which in connection with the convexity of the surface insures a continuous narrow bearing-surface without lugs or other projections particularly suitable for travel over bridges and hard pavements.

When traveling in muddy ground, the wheel is self-cleaning, because owing to its convexity and the increasing inclination of the recesses from the middle line outward it tends to squeeze and force the mud sidewise beyond the edge of the rim. The inclined presentation sidewise also tends to prevent side slip of the wheel in such ground. The total breadth of the rim may be considerable, so that it will settle but slightly in sandy ground and not tend to dig, as a narrow rim would. The existence of a continuous unbroken surface all around the wheel serves to avoid jolting and vibration on hard ground.

By the construction described a very effective traction-wheel is produced well adapted to all kinds and conditions of soil and which will automatically adjust the depth of its cut and width of its bearing-surface to the condition of the road on which it is operated.

What we claim as new, and desire to secure by Letters Patent, is—

A traction-wheel rim or tire having a convex face, and semiconical recesses therein alternately on opposite sides, said recesses being spaced from each other and tapered inwardly from the edges of the rim, producing a continuous unbroken tread at the crown of the rim, substantially as described.

In testimony whereof we affix our signatures in presence of two witnesses.

CLAUD C. NICHOLS.
CHARLES S. NICHOLS.

Witnesses:
R. S. NICHOLS,
A. W. EVANS.